US012785195B2

(12) United States Patent
Xue et al.

(10) Patent No.: US 12,785,195 B2
(45) Date of Patent: Nov. 3, 2026

(54) BATTERY ASSEMBLY

(71) Applicant: SCHAEFFLER TECHNOLOGIES AG & CO. KG, Herzogenaurach (DE)

(72) Inventors: Jianbo Xue, Shanghai (CN); Yong Liu, Shanghai (CN); Zhifu Huang, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 574 days.

(21) Appl. No.: 18/036,684

(22) PCT Filed: Nov. 13, 2020

(86) PCT No.: PCT/CN2020/128715
§ 371 (c)(1),
(2) Date: May 12, 2023

(87) PCT Pub. No.: WO2022/099623
PCT Pub. Date: May 19, 2022

(65) Prior Publication Data

US 2023/0420782 A1 Dec. 28, 2023

(51) Int. Cl.

| | |
|---|---|
| ***H01M 50/258*** | (2021.01) |
| ***H01M 10/613*** | (2014.01) |
| ***H01M 10/6568*** | (2014.01) |
| ***H01M 50/213*** | (2021.01) |
| ***H01M 50/262*** | (2021.01) |
| ***H01M 50/51*** | (2021.01) |

(52) U.S. Cl.
CPC ....... *H01M 50/258* (2021.01); *H01M 10/613* (2015.04); *H01M 10/6568* (2015.04); *H01M 50/213* (2021.01); *H01M 50/262* (2021.01); *H01M 50/51* (2021.01)

(58) Field of Classification Search
CPC ............... H01M 10/613; H01M 10/65; H01M 10/6556; H01M 10/6568; H01M 50/258; H01M 50/262; H01M 50/51; H01M 50/213
See application file for complete search history.

(56) References Cited

U.S. PATENT DOCUMENTS

| | | | | |
|---|---|---|---|---|
| 10,622,687 B2 * | 4/2020 | Gunna | ................ | H01M 50/271 |
| 11,329,332 B2 * | 5/2022 | Singer | ............... | H01M 10/6567 |
| 2011/0212355 A1 * | 9/2011 | Essinger | ........... | H01M 10/6555 429/120 |

(Continued)

FOREIGN PATENT DOCUMENTS

| | | |
|---|---|---|
| CN | 105431961 A | 3/2016 |
| CN | 105453331 A | 3/2016 |

(Continued)

OTHER PUBLICATIONS

Machine translation of JP 11-329514 (no date) (Year: 0000).*

*Primary Examiner* — Amanda C. Walke
(74) *Attorney, Agent, or Firm* — Volpe Koenig

(57) ABSTRACT

A battery assembly, comprising a plurality of battery units, wherein each of the battery units includes one or more batteries; adjacent battery units are detachably and electrically connected; coolant flow channels for a coolant to pass therethrough are formed in the battery units; and the coolant flow channels of the plurality of battery units are in communication with each other.

20 Claims, 4 Drawing Sheets

(56) References Cited

U.S. PATENT DOCUMENTS

| | | | | |
|---|---|---|---|---|
| 2012/0219846 | A1 | 8/2012 | Chan | |
| 2015/0303422 | A1* | 10/2015 | Poller | H01M 50/171<br>429/54 |
| 2016/0372734 | A1 | 12/2016 | Berthe De Pommery et al. | |
| 2023/0420782 | A1* | 12/2023 | Xue | H01M 10/6567 |

FOREIGN PATENT DOCUMENTS

| | | | | | |
|---|---|---|---|---|---|
| CN | 107785509 | A | | 3/2018 | |
| CN | 108987785 | A | | 12/2018 | |
| CN | 221262570 | U | * | 7/2024 | B60L 3/0046 |
| DE | 202008012599 | A1 | | 2/2010 | |
| DE | 102021005767 | A1 | * | 5/2023 | H01M 50/207 |
| JP | H11329514 | A | | 11/1999 | |
| JP | 2006185778 | | | 7/2006 | |
| JP | 2020145067 | A | | 9/2020 | |
| WO | WO-2024198031 | A1 | * | 10/2024 | H01M 50/289 |

* cited by examiner

BATTERY ASSEMBLY

CROSS-REFERENCE TO RELATED APPLICATIONS

This application is the U.S. National Phase of PCT Appln. No. PCT/CN2020/128715 filed Nov. 13, 2020, the entire disclosure of which is incorporated by reference herein.

TECHNICAL FIELD

The present disclosure relates to batteries, and in particular to a battery assembly.

BACKGROUND

A hybrid vehicle or a pure electric vehicle generally needs to use a high-voltage battery.

One possible method of providing the high-voltage battery is to connect multiple low-voltage batteries (also known as cells) in series and parallel to form a high-voltage battery assembly. Generally, for production, it is required to use wires to firstly connect cells of a predetermined number in series and parallel as needed, and then accommodate the multiple cells connected in series and parallel in a single frame (or a housing) for convenient use. The battery assembly formed by the above method has the following disadvantages:

(i) for example, when the battery needs to be replaced due to aging or failure, the external housing needs to be disassembled, even in a destructive manner, which results in a complex process and high cost;

(ii) the shape of the housing is fixed, which also imposes a strict restriction on the shape of the battery assembly. For example, when the space for mounting the battery assembly in a vehicle is not large enough, it is hard to adapt the shape of the battery assembly to the actual mounting requirements;

(iii) in order to meet the requirements of heat dissipation of the battery assembly, it is generally required to provide an additional heat dissipation system for the battery assembly, the additional heat dissipation system takes up a lot of space.

SUMMARY

The present disclosure aims to overcome or at least ameliorate the foregoing disadvantages of the prior art and to provide a battery assembly.

The present disclosure provides, according to an exemplary embodiment, a battery assembly which includes a plurality of battery units. Each of the battery units includes one or more batteries. Adjacent battery units are detachably and electrically connected to each other. Coolant flow channels for a coolant to pass therethrough are formed in the battery units, and the coolant flow channels of the plurality of battery units are in communication with one another.

In at least one embodiment, the plurality of battery units are connected end-to-end to be in series.

In at least one embodiment, adjacent battery units are rotatable relative to each other.

In at least one embodiment, each battery unit includes a housing and a base, wherein the housing is mounted to the base, and the coolant is able to flow between the housing and the base, and wherein the bases of adjacent battery units are connected to each other, and the one or more batteries are accommodated in the housing.

In at least one embodiment, the base includes a base body. A connection direction of adjacent battery units is defined as a first direction. In the first direction, two ends of the base body respectively form a base protrusion and a base recess, and the base protrusion of one of two adjacent base bodies is embedded in the base recess of the other one of the two adjacent base bodies for interconnection.

In at least one embodiment, in a second direction perpendicular to the first direction, a hinge pin is directed through the base protrusion and the base recess, which are engaged with each other, so that two adjacent base bodies are connected rotatably relative to each other.

In at least one embodiment, the base protrusion and the base recess of each battery unit are spaced apart in the first direction, and the housing is clamped between the base protrusion and the base recess.

In at least one embodiment, a base first channel, as a part of the coolant flow channels, is formed inside the base protrusion, and the base first channel forms a base first-channel outer-opening and a base first-channel inner-opening on a surface of the base body; a base second channel, as a part of the coolant flow channels, is formed inside the base recess, and the base second channel forms a base second-channel outer-opening and a base second-channel inner-opening on the surface of the base body; the base first-channel outer-opening of one of two adjacent base bodies is connected with the base second-channel outer-opening of the other one of the two adjacent base bodies; and the base first-channel inner-opening and the base second-channel inner-opening of each base body are oppositely arranged and are open to the coolant flow channel located in the housing.

In at least one embodiment, the housing includes a housing body, wherein a housing channel, as a part of the coolant flow channels, is formed inside the housing body, and in the first direction, the housing channel is open to the base protrusion and the base recess located on two sides of the housing body to form a housing-channel first opening and a housing-channel second opening.

In at least one embodiment, in the first direction, two surfaces, respectively facing towards the base protrusion and the base recess located on the two sides, of the housing body are partially recessed inward to form a first groove and a second groove respectively, and the base protrusion is partially embedded in the first groove, and the base recess is partially embedded in the second groove.

In at least one embodiment, the base further includes a base insert, wherein the base insert is clamped between the base body and the housing body, and is configured to mount a component for achieving electrical connection.

In at least one embodiment, one or more battery cavities configured to accommodate the one or more batteries are formed inside the housing, and the one or more battery cavities are not in communication with the coolant flow channels.

In at least one embodiment, the housing further includes a housing end cover configured to seal the one or more battery cavities at one end of the one or more battery cavities.

In at least one embodiment, the housing further includes a latch assembly configured to control the opening and closing of the housing end cover.

In at least one embodiment, adjacent battery units are electrically connected via a flexible connecting member.

In at least one embodiment, in the connection direction of adjacent battery units, the battery units located at two ends of the battery assembly are respectively connected with an inlet module and an outlet module, the inlet module is configured to allow the coolant to flow into the coolant flow channels, and the outlet module is configured to allow the coolant to flow out of the coolant flow channels.

The battery assembly according to the present disclosure has the advantages of simple structure, high modularity, and good heat dissipation.

DESCRIPTION OF REFERENCE NUMERALS

10 housing; 11 housing body; 111 battery cavity; 112 housing channel; 112*a* housing-channel first opening; 112*b* housing-channel second opening; 113 first groove; 114 second groove; 115 bottom groove; 116 latch groove; 116*a* locking hole; 11*a* recess;

12 housing end cover; 120 electrical contact; 121 first half cover; 122 second half cover; 123 cover pin;

13 latch assembly; 131 substrate; 132 movable latch; 132*a* screw hole; 133 elastic member;

20 base; 21 base body; 21*a* base protrusion; 21*b* base recess; 21*d* base bottom;

211 base first channel; 211*a* base first-channel inner-opening; 211*b* base first-channel outer-opening; 212 base second channel; 212*a* base second-channel inner-opening; 212*b* base second-channel outer-opening;

213 internal pinhole; 214 external pinhole; 214*b* internal thread; 215 stepped hole; 216 side hole;

22 base insert; 220 insert body; 221 insert boss; 22*a* insert hole;

23 base sealing cover; 24 electrical connection terminal; 25 spring;

30 battery; 40 hinge pin; 40*b* external thread; 50 flexible connecting member; 60 external terminal;

U battery unit; W1 inlet module; W2 outlet module; W10 coolant inlet; W20 coolant outlet; C coolant flow channel;

D1 first direction; D2 second direction.

DETAILED DESCRIPTION OF EMBODIMENTS

Exemplary embodiments of the present disclosure will be described below with reference to the attached drawings. It should be understood that these specific descriptions are only used to teach those skilled in the art how to implement the present disclosure, and are neither intended to be exhaustive of all possible variations of the present disclosure nor to limit the scope of the present disclosure.

Referring to FIG. 1 to FIG. 5, a battery assembly according to the present disclosure is described.

Figure 1:
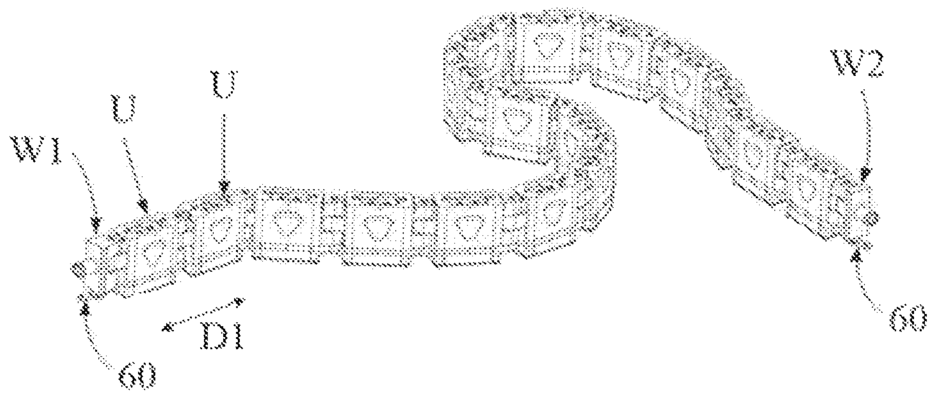
FIG. 1 is a schematic diagram of a battery assembly according to an embodiment of the present disclosure.

Firstly, referring to FIG. 1, the battery assembly according to the present disclosure includes an inlet module W1, an outlet module W2 and a plurality of battery units U. Adjacent battery units U are connected end-to-end to form a chain-shaped battery assembly. A length direction of the chain-shaped battery assembly, or in other words, a connection direction of adjacent battery units U, is also referred to as a first direction D1 herein. Two ends of the battery assembly in the first direction D1 are the inlet module W1 and the outlet module W2 respectively.

The battery assembly is integrated with cells (also referred to as batteries 30 hereinafter) for storing electricity and coolant flow channels C (cf. FIG. 3) for a coolant to flow therethrough.

The batteries 30 are mounted in each battery unit U, and the coolant flow channels C located in the battery units U are in communication with one another. The coolant can enter the battery assembly from the inlet module W1, and flow out from the outlet module W2 after flowing through each battery unit U. For example, a pump for pumping the coolant may be provided between the inlet module W1 and the outlet module W2 to promote the flow of coolant, or a pump may be provided upstream from the inlet module W1 or downstream from the outlet module W2.

In an exemplary embodiment, adjacent battery units U are rotatably connected relative to each other, so that the shape of the whole battery assembly can be adjusted as required to adapt the battery assembly to the actual mounting space.

In addition, since the battery units U are connected in modules, for example in series with one another, to form the battery assembly, different numbers of battery units U can be flexibly used as required to form battery assemblies with different voltage values.

Figure 2:
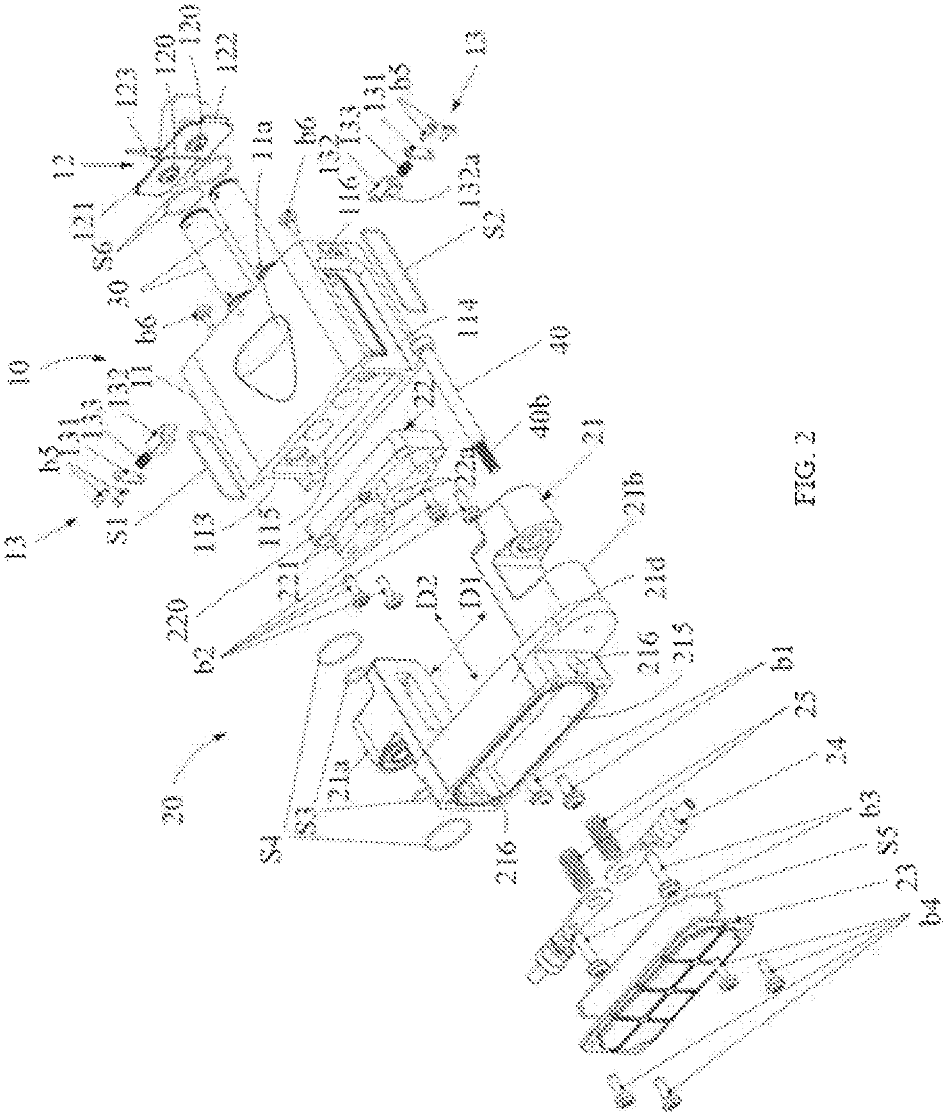
FIG. 2 is a schematic exploded view of a battery unit of the battery assembly according to an embodiment of the present disclosure.

FIG. 2 is an exploded view of a single battery unit U. Referring to FIG. 2, the battery unit U includes a housing 10, a base 20, a battery 30 and a hinge pin 40. The battery 30 is accommodated in the housing 10. The base 20 is configured to fix the housing 10. Adjacent battery units U are connected to the base 20.

The housing 10 includes a housing body 11, a housing end cover 12 mounted to the housing body 11, and a latch assembly 13.

Figure 3:
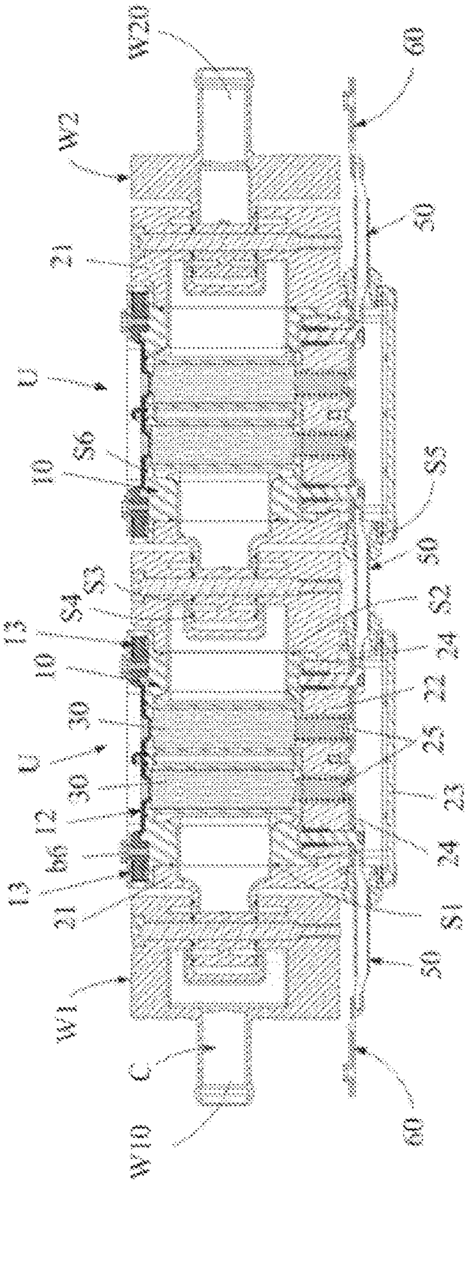
FIG. 3 is a cross-sectional view of the battery assembly including two battery units according to an embodiment of the present disclosure.
Figure 4:
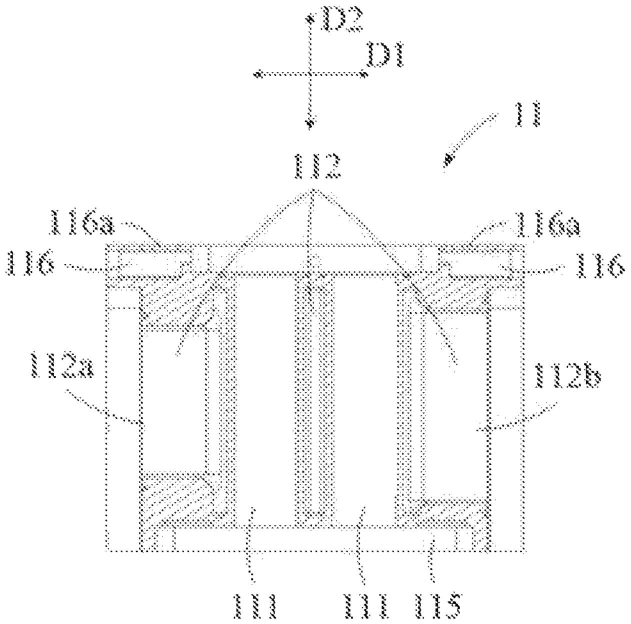
FIG. 4 is a cross-sectional view of a housing body of the battery unit according to an embodiment of the present disclosure.

Referring to FIG. 3 and FIG. 4, the housing body 11 is substantially a rectangular parallelepiped. A battery cavity 111 and a housing channel 112 are formed inside the housing body 11.

The battery cavity 111 is configured to accommodate the battery 30. In an exemplary embodiment, each battery unit U is provided with two batteries 30 and two corresponding battery cavities 111. The battery cavities 111 are through in a second direction D2 perpendicular to the first direction D1.

The housing channel 112 constitutes part of the coolant flow channel C of the battery unit U. The housing channel 112 forms two openings at two ends of the housing body 11 in the first direction D1 respectively, namely a housing-channel first opening 112*a* and a housing-channel second opening 112*b*. These two openings are configured to be in communication with openings of a base body 21, which is further described below, so as to achieve the flow of the coolant in the housing body 11 and the base body 21.

The housing channel 112 may surround each battery cavity 111, so as to improve the cooling effect on the batteries 30.

Next, some sections of the coolant flow channel C formed in the base 20 and the cooperation relationship between these sections and the housing channel 112 are described.

Figure 5:
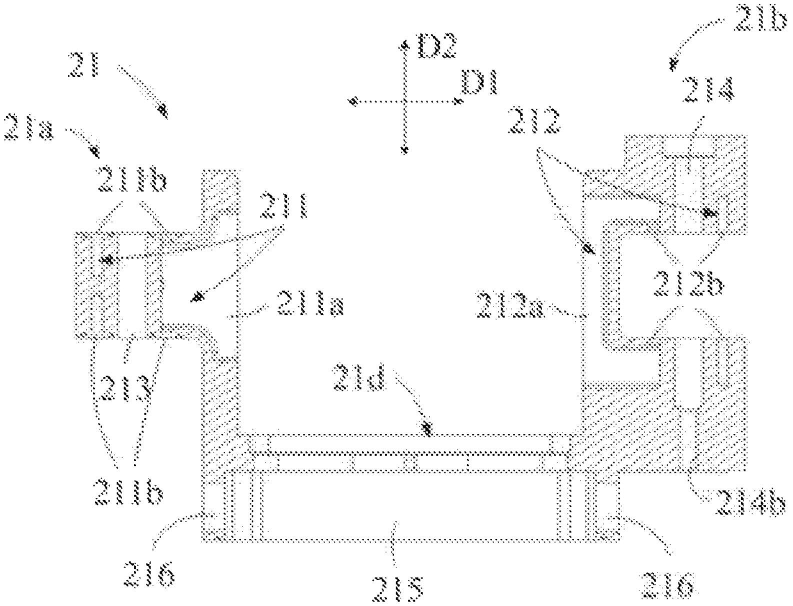
FIG. 5 is a cross-sectional view of a base body of the battery unit according to an embodiment of the present disclosure.

Referring to FIG. 2, FIG. 3 and FIG. 5, the base 20 includes the base body 21, a base insert 22 mounted to the base body 21, a base sealing cover 23, electrical connection terminals 24, and springs 25.

The base body 21 includes a base bottom 21*d*, a base protrusion 21*a* and a base recess 21*b*. The base protrusion 21*a* and the base recess 21*b* are located at two ends of the base bottom 21*d* in the first direction D1. The base bottom 21*d*, the base protrusion 21*a* and the base recess 21*b* form a frame structure to clamp the housing body 11. Specifically, in the first direction D1, the housing body 11 is clamped between the base protrusion 21*a* and the base recess 21*b*.

Surfaces, respectively facing towards the base protrusion 21*a* and the base recess 21*b*, of the housing body 11 may be partially recessed inward to form a first groove 113 and a second groove 114 respectively. Both the first groove 113 and the second groove 114 are open to an end, facing towards the base bottom 21*d*, of the housing body 11. Therefore, when the housing body 11 is clamped between the base protrusion 21*a* and the base recess 21*b*, the base protrusion 21*a* is partially embedded in the first groove 113, and the base recess 21*b* is partially embedded in the second groove 114. Such arrangement, on one hand, ensures a circumferential positioning of the housing body 11 relative to the base body 21, and one the other hand enhances the tightness of the fit between the housing body 11 and the base body 21, and also enhances the sealing degree of the abutting sections of the coolant flow channel C respectively located in the housing body 11 and the base body 21.

Two adjacent base bodies 21 are connected to each other with the base protrusion 21*a* of one of the two adjacent base bodies 21 being embedded into the base recess 21*b* of the other one of the two adjacent base bodies 21.

In an exemplary embodiment, an internal pinhole 213 that is through in the second direction D2 is formed inside the base protrusion 21*a*, and an external pinhole 214 that is through in the second direction D2 is formed inside the base recess 21*b*. After the base protrusion 21*a* of one base body 21 is embedded into the base recess 21*b* of another base body 21, the internal pinhole 213 and the external pinhole 214 are aligned and in communication with each other to form a complete pinhole. The hinge pin 40 extends into the pinhole, so that two adjacent base bodies 21 form a hinged, or in other words, a rotatable connection structure.

In the second direction D2, part of the interior of the external pinhole 214 may be provided with an internal thread 214*b*. Correspondingly, part of the hinge pin 40 is provided with an external thread 40*b*. The hinge pin 40 is fixed to the base body 21 by the threaded engagement of the external thread 40*b* and the internal thread 214*b*.

A base first channel 211 is formed inside the base protrusion 21*a*, a base second channel 212 is formed inside the base recess 21*b*, and the base first channel 211 and the base second channel 212 are both part of the coolant flow channel C.

The base first channel 211 forms a base first-channel inner-opening 211*a* and a base first-channel outer-opening 211*b* on a surface of the base protrusion 21*a*. The base second channel 212 forms a base second-channel inner-opening 212*a* and a base second-channel outer-opening 212*b* on a surface of the base recess 21*b*.

The base first-channel inner-opening 211*a* and the base second-channel inner-opening 212*a* are oppositely arranged, and are respectively configured to be in communication and connected with the housing-channel first opening 112*a* and the housing-channel second opening 112*b* of the housing body 11 embedded in the base body 21. Therefore, the flow of the coolant between the housing 10 and the base 20 can be achieved.

Between the housing body 11 and the base body 21, a first sealing ring S1 may be provided at an outer periphery of an area where the base first-channel inner-opening 211*a* is connected with the housing-channel first opening 112*a*, and a second sealing ring S2 may be provided at an outer periphery of an area where the base second-channel inner-opening 212*a* is connected with the housing-channel second opening 112*b*.

The base first-channel outer-opening 211*b* is configured to be in communication with the base second-channel outer-opening 212*b* located in the adjacent base body 21, so as to achieve the flow of the coolant between adjacent battery units U.

In an exemplary embodiment, the base first-channel outer-openings 211*b* are located on two end surfaces of the base protrusion 21*a* in the second direction D2, that is, two base first-channel outer-openings 211*b* facing away from each other are formed on each base protrusion 21*a*. Each base first-channel outer-opening 211*b* is annular, and surrounds the internal pinhole 213. Correspondingly, there are two base second-channel outer-openings 212*b* which are respectively located on two opposite surfaces of a recessed area of the base recess 21*b*. Each base second-channel outer-opening 212*b* is annular, and surrounds the external pinhole 214.

Between the base protrusion 21*a* and the base recess 21*b*, a third sealing ring S3 may be provided on an inner peripheral side of the base first-channel outer-openings 211*b* (or in other words, the base second-channel outer-openings 212*b*), and a fourth sealing ring S4 may be provided on an outer peripheral side of the base first-channel outer-openings 211*b*.

Referring to the rotatable connection structure between adjacent base bodies 21 and to the arrangement method of the coolant flow channel C described earlier, the inlet module W1 and the outlet module W2 located at the two ends of the battery assembly have similar connection structures and arrangement methods of flow channel. It can be understood that the structures of the connection between the inlet module W1 and the adjacent base body 21 and the connection between the outlet module W2 and the adjacent base body 21 are respectively similar to the base recess 21*b* and the base protrusion 21*a*, which will not be described in detail herein. The inlet module W1 and the outlet module W2 respectively provide a coolant inlet W10 and a coolant outlet W20, so as to facilitate the connection between the battery assembly and the external coolant circulation system.

The electrical connection structure and other auxiliary structures inside the battery assembly are described in the following.

Referring to FIG. 2 to FIG. 5, the base insert 22 is clamped between the housing body 11 and the base body 21. Part of the base insert 22 is embedded in the housing body 11, and part of the base insert 22 is embedded in the base bottom 21*d*.

The base insert 22 includes an insert body 220 and two insert bosses 221. The two insert bosses 221 protrude from the insert body 220 in a direction away from the housing body 11, so that the base insert 22 has a stepped structure.

A stepped hole 215 which is through in the second direction D2 is formed inside the base bottom 21*d*. The insert bosses 221 and part of the insert body 220 are embedded into the stepped hole 215 to be positioned relative to the base body 21.

The fixation of the base insert 22 to the base body 21 may be achieved via a screw b1 that penetrates through the base bottom 21*d* and extends into the base insert 22.

A surface, facing towards the base bottom 21*d*, of the housing body 11 is partially recessed inward to form a bottom groove 115. The insert body 220 is partially embedded into the bottom groove 115 to be positioned relative to the housing body 11.

The fixation of the base insert 22 to the housing body 11 may be achieved via a screw b2 that penetrates through the base insert 22 and extends into the housing body 11.

Therefore, the fixation of the housing body 11 to the base body 21 is achieved by connecting the base insert 22 with the housing body 11 and the base body 21.

Two insert holes 22*a* which are through in the second direction D2 are formed in the base insert 22, and the insert holes 22*a* are configured to mount the springs 25.

Surfaces, facing away from the insert body 220, of the insert bosses 221 are fixed with two electrical connection terminals 24, for example, via screws b3. The springs 25 are accommodated in the insert holes 22*a* and are connected with the electrical connection terminals 24. In a natural state, the springs 25 partially extend into the battery cavities 111. Therefore, after the batteries 30 are placed in the battery cavities 111, the batteries 30 can compress the springs so that the connection between the batteries 30 and the circuit is more reliable.

In an exemplary embodiment, the electrical connection terminals 24 are partially accommodated in the stepped hole 215, and partially extend out from side holes 216 located on two side walls of the base bottom 21*d* so as to electrically connect with adjacent battery units U.

An end, facing away from the housing body 11, of the stepped hole 215 is sealed via the base sealing cover 23, so as to ensure safety such as insulation. For example, the base sealing cover 23 is connected with the base body 21 via a screw b4. A fifth sealing member S5 may be provided between the base sealing cover 23 and the base body 21.

The other end of the battery unit U in the second direction D2, that is, the end, facing away from the base bottom 21*d*, of the housing body 11, is provided with a housing end cover 12 configured to seal the battery cavities 111 and a latch assembly 13 which is configured to control the opening and closing of the housing end cover 12.

The housing end cover 12 includes two half covers (a first half cover 121 and a second half cover 122) and a cover pin 123. The cover pin 123 is fixed to the housing body 11. Both the first half cover 121 and the second half cover 122 are hinged to the housing body 11 via the cover pin 123. Each half cover 121, 122 is configured to cover one battery cavity 111. An electrical contact 120, in contact with a positive or negative terminal of the battery 30, is formed in each half cover. Two electrical contacts 120 located in the two half covers 121, 122 are electrically connected with each other. For example, materials of the two half covers 121, 122 both include metal sheets, and the two metal sheets are in contact at the hinge portion to achieve electrical connection. In order to ensure the insulation of the battery assembly relative to the external environment, an insulation layer may be covered on a surface, facing towards the external environment, of the housing end cover 12. When the two half covers 121, 122 are both closed, the two batteries inside one battery unit U are connected in series.

The closing of each half cover 121, 122 is controlled by one latch assembly 13. Each latch assembly 13 includes a substrate 131, a movable latch 132 and an elastic member 133.

Each of the two ends of the housing body 11 in the first direction D1 forms a latch groove 116 for accommodating the corresponding latch assembly 13.

The substrate 131 is fixed to the housing body 11, for example, via a screw b5. The substrate 131 and the movable latch 132 are connected to each other via the elastic member 133 (such as a spring). In a natural state, the elastic member 133 is slightly compressed and applies elastic force to the movable latch 132, so that the movable latch 132 partially extends out of the latch groove 116 towards a side where the half cover is located, so as to secure the half cover. When the half cover needs to be opened, the movable latch 132 can be moved to further compress the elastic member 133, so that the movable latch 132 is separated from the half cover.

In order to ensure the closing of the half cover during use, a screw hole 132*a* may be defined in the movable latch 132, and a locking hole 116*a* may be defined in the housing body 11. The locking hole 116*a* is aligned with the screw hole 132*a* when the half cover is locked by the movable latch 132. The movable latch 132 is fixed in a locking position by using a screw b6 that extends through the locking hole 116*a* and the screw hole 132*a*. When the half cover needs to be opened, the screw b6 can be removed.

Between the housing end cover 12 and the housing body 11, a sixth sealing ring S6 may be provided at an outer periphery of each battery 30.

Adjacent battery units U are connected to each other via a flexible connecting member 50. The flexible connecting member 50 connects two adjacent electrical connection terminals 24 of the adjacent battery units U together, thereby achieving the series connection of the batteries 30 of the adjacent battery units U.

Each of the two electrical connection terminals 24 located at two ends of the battery assembly is connected with one external terminal 60 via a flexible connecting member 50, and the two external terminals 60 are respectively used as a positive terminal and a negative terminal of the battery assembly.

The flexible connecting member 50 may include a conductor and a superficial insulation layer, so as to ensure insulation between the battery assembly and the external environment. The flexibility of the flexible connecting member 50 enables it to adapt itself to different angles formed by adjacent battery units U.

The flexible connecting member 50 also may have certain rigidity, so that the flexible connecting member 50 can resist a certain amount of further deformation while it is bent, so as to assist the two adjacent battery units U in maintaining a certain angle. Therefore, the entire battery assembly has a relatively stable shape.

In order to facilitate the assembly and disassembly of the housing 10 and the base 20, a surface of the housing body 11 may be partially recessed inward to form a recess 11*a* which is convenient for an operator to grasp.

Some of the beneficial effects of the above-mentioned embodiments of the present disclosure are briefly described hereinafter.

(i) The battery 30 can be easily mounted into or removed from the housing 10, so that the battery 30 can be conveniently replaced when the battery 30 needs to be replaced due to, for example, aging or malfunction of the battery 30.

(ii) The frame (including the housing 10 and the base 20, etc.) for accommodating the battery 30 not only provides structural (mechanical) connections for a plurality of batteries 30, but also achieves electrical connections of the plurality of batteries 30.

(iii) The frame (including the housing 10 and the base 20, etc.) for accommodating the battery 30 provides structural (mechanical) connections for the batteries 30, and the coolant flow channels are integrated in the frame, so that the volume of the whole battery assembly is reduced while the batteries 30 are effectively cooled.

(iv) The two half covers 121, 122 of the housing end cover 12 are connected with each other, which can achieve the electrical connection of two batteries 30 in one single battery unit U.

(v) The number of the battery units U included in the battery assembly can be flexibly adjusted as required, so as to meet the requirements of different voltages or currents.

(vi) The battery assembly is chain-shaped and can change its shape, to allow it to meet the requirements of different mounting spaces.

It should be understood that the above-mentioned embodiments are exemplary only and are not intended to limit the present disclosure. Those skilled in the art can make various modifications and changes to the above-mentioned embodiments according to the teaching of the present disclosure without departing from the scope of the present disclosure. For example, in the illustrated embodiments, each battery unit U includes two batteries 30 connected in series, and such arrangement makes it easier to connect adjacent battery units U in series with the positive terminal being connected with the negative terminal. However, the present disclosure is not limited to the solution where two batteries 30 are arranged in each battery unit U. In other possible embodiments, the negative and positive terminals of the batteries 30 may be connected via other structures.

The invention claimed is:

1. A battery assembly, comprising a plurality of battery units, wherein each of the plurality of battery units includes one or more batteries, and adjacent battery units are detachably and electrically connected to each other; coolant flow channels for a coolant to pass through are formed in the plurality of battery units, and the coolant flow channels of the plurality of battery units are in communication with one another; wherein adjacent battery units are rotatable relative to each other; wherein a connection direction of adjacent battery units is defined as a first direction; and wherein in a second direction perpendicular to the first direction, adjacent battery units are pivotably connected.

2. The battery assembly according to claim 1, wherein the plurality of battery units are connected end-to-end to be in series.

3. The battery assembly according to claim 1, wherein each of the plurality of battery units includes a housing and a base, wherein the housing is mounted to the base, and the coolant is able to flow between the housing and the base, and wherein the bases of adjacent battery units are connected to each other, and the one or more batteries are accommodated in the housing.

4. The battery assembly according to claim 3, wherein the base includes a base body, wherein in the first direction, two ends of the base body respectively form a base protrusion and a base recess, and the base protrusion of one of two adjacent base bodies is embedded in the base recess of the other one of the two adjacent base bodies for interconnection.

5. The battery assembly according to claim 4, wherein in the second direction perpendicular to the first direction, a hinge pin is directed through the base protrusion and the base recess, which are engaged with each other, so that two adjacent base bodies are connected rotatably relative to each other.

6. The battery assembly according to claim 4, wherein the base protrusion and the base recess of each battery unit are spaced apart in the first direction, and the housing is clamped between the base protrusion and the base recess.

7. The battery assembly according to claim 6, wherein a base first channel, as a part of the coolant flow channels, is formed inside the base protrusion, and the base first channel forms a base first-channel outer-opening and a base first-channel inner-opening on a surface of the base body;

a base second channel as a part of the coolant flow channels, is formed inside the base recess, and the base second channel forms a base second-channel outer-opening and a base second-channel inner-opening on the surface of the base body;

the base first-channel outer-opening of one of two adjacent base bodies is connected with the base second-channel outer-opening of the other one of the two adjacent base bodies; and the base first-channel inner-opening and the base second-channel inner-opening of each base body are oppositely arranged and are open to the coolant flow channel located in the housing.

8. The battery assembly according to claim 6, wherein the housing includes a housing body, wherein a housing channel, as a part of the coolant flow channels, is formed inside the housing body, and in the first direction, the housing channel is open to the base protrusion and the base recess located on two sides of the housing body to form a housing-channel first opening and a housing-channel second opening.

9. The battery assembly according to claim 8, wherein in the first direction, two surfaces, respectively facing towards the base protrusion and the base recess located on the two sides, of the housing body are partially recessed inward to form a first groove and a second groove respectively, and the base protrusion is partially embedded in the first groove, and the base recess is partially embedded in the second groove.

10. The battery assembly according to claim 8, wherein the base further includes a base insert, wherein the base insert is clamped between the base body and the housing body, and is configured to mount a component for achieving electrical connection.

11. The battery assembly according to claim 3, wherein one or more battery cavities configured to accommodate the one or more batteries are formed inside the housing, and the one or more battery cavities are not in communication with the coolant flow channels.

12. The battery assembly according to claim 11, wherein the housing further includes a housing end cover configured to seal the one or more battery cavities at one end of the one or more battery cavities.

13. The battery assembly according to claim 12, wherein the housing further includes a latch assembly configured to control opening and closing of the housing end cover.

14. The battery assembly according to claim 1, wherein adjacent battery units are electrically connected via a flexible connecting member.

15. The battery assembly according to claim 1, wherein in a connection direction of adjacent battery units, the battery units located at two ends of the battery assembly are respectively connected with an inlet module and an outlet module, the inlet module is configured to allow the coolant to flow into the coolant flow channels, and the outlet module is configured to allow the coolant to flow out of the coolant flow channels.

16. A battery assembly, comprising a plurality of battery units, wherein each of the plurality of battery units includes one or more batteries, and adjacent battery units are detachably and electrically connected to each other; coolant flow channels for a coolant to pass through are formed in the plurality of battery units, and the coolant flow channels of the plurality of battery units are in communication with one another, wherein the plurality of battery units are connected end-to-end to be in series, wherein adjacent battery units are rotatable relative to each other, wherein each of the plurality of battery units includes a housing and a base, wherein the housing is mounted to the base, and the coolant is able to flow between the housing and the base, and wherein the bases of adjacent battery units are connected to each other, and the one or more batteries are accommodated in the housing, and wherein the base includes a base body, wherein a connection direction of adjacent battery units is defined as a first direction; in the first direction, two ends of the base body respectively form a base protrusion and a base recess, and the base protrusion of one of two adjacent base bodies is embedded in the base recess of the other one of the two adjacent base bodies for interconnection.

17. The battery assembly according to claim 16, wherein in a second direction perpendicular to the first direction, a hinge pin is directed through the base protrusion and the base recess, which are engaged with each other, so that two adjacent base bodies are connected rotatably relative to each other.

18. The battery assembly according to claim 17, wherein the base protrusion and the base recess of each battery unit are spaced apart in the first direction, and the housing is clamped between the base protrusion and the base recess.

19. The battery assembly according to claim 18, wherein a base first channel, as a part of the coolant flow channels, is formed inside the base protrusion, and the base first channel forms a base first-channel outer-opening and a base first-channel inner-opening on a surface of the base body;

a base second channel as a part of the coolant flow channels, is formed inside the base recess, and the base second channel forms a base second-channel outer-opening and a base second-channel inner-opening on the surface of the base body;

the base first-channel outer-opening of one of two adjacent base bodies is connected with the base second-channel outer-opening of the other one of the two adjacent base bodies; and the base first-channel inner-opening and the base second-channel inner-opening of each base body are oppositely arranged and are open to the coolant flow channel located in the housing.

20. A battery assembly, comprising a plurality of battery units, wherein each of the plurality of battery units includes one or more batteries, and adjacent battery units are detachably and electrically connected to each other; coolant flow channels for a coolant to pass through are formed in the plurality of battery units, and the coolant flow channels of the plurality of battery units are in communication with one another; wherein adjacent battery units are electrically connected via a flexible connecting member.

* * * * *